US012536743B2

(12) United States Patent
Witman

(10) Patent No.: US 12,536,743 B2
(45) Date of Patent: Jan. 27, 2026

(54) COMPUTER-IMPLEMENTED METHOD, COMPUTER PROGRAM PRODUCT, AND SYSTEM FOR BROKERING ON-DEMAND COMPETITIVE RACING AND VIRTUAL CAR STORAGE

(71) Applicant: Skyler Witman, Draper, UT (US)

(72) Inventor: Skyler Witman, Draper, UT (US)

( * ) Notice: Subject to any disclaimer, the term of this patent is extended or adjusted under 35 U.S.C. 154(b) by 620 days.

(21) Appl. No.: 17/864,986

(22) Filed: Jul. 14, 2022

(65) Prior Publication Data

US 2023/0386131 A1 Nov. 30, 2023

Related U.S. Application Data

(60) Provisional application No. 63/345,890, filed on May 25, 2022.

(51) Int. Cl.
*A63F 13/65* (2014.01)
*A63F 13/798* (2014.01)
*A63F 13/803* (2014.01)
*G06F 16/22* (2019.01)
*G06F 30/15* (2020.01)
*G06T 17/00* (2006.01)

(52) U.S. Cl.
CPC ............ *G06T 17/005* (2013.01); *A63F 13/65* (2014.09); *A63F 13/798* (2014.09); *A63F 13/803* (2014.09); *G06F 16/2246* (2019.01); *G06F 30/15* (2020.01); *A63F 2300/558* (2013.01); *A63F 2300/69* (2013.01); *A63F 2300/8017* (2013.01)

(58) Field of Classification Search
CPC ............... G06T 17/005; G06T 2210/61; G06F 16/2246; G06F 30/15; A63F 13/65; A63F 13/798; A63F 13/803; A63F 13/46; A63F 13/63; A63F 2300/558; A63F 2300/69; A63F 2300/8017
USPC ............................................................ 463/6
See application file for complete search history.

(56) References Cited

U.S. PATENT DOCUMENTS 6,745,126 B1 * 6/2004 Pavlak .................. A01K 29/00
  348/E13.019
6,754,485 B1 * 6/2004 Obradovich ............ H04L 51/58
  340/7.52

(Continued)

OTHER PUBLICATIONS

PCT Search Report and Written Opinion issued in related application PCT/US2022/037186, Dec. 6, 2022, 12 pages.

*Primary Examiner* — Michael A Cuff
(74) *Attorney, Agent, or Firm* — Faegre Drinker Biddle & Reath LLP

(57) ABSTRACT

A computer program product, system, and computer-implemented method for brokering an online racing event between a plurality of drivers and storing data relating to modifications of performance vehicles in a virtual garage. The method includes creation of a virtual vehicles from data structures of included components, and historical data relating to aftermarket components and accessories added to the vehicle. Drivers may be matched together using a matching algorithm, and racing data gathered in real time during a racing event is used to determine a relative performance rating for each driver. An available pool of drivers is determined based on said driver's performance rating and a driver selection criteria.

9 Claims, 15 Drawing Sheets

(56) References Cited

U.S. PATENT DOCUMENTS

| | | | |
|---|---|---|---|
| 7,266,515 B2* | 9/2007 | Costello | G06Q 30/02 705/26.61 |
| 2004/0043806 A1* | 3/2004 | Kirby | A63F 13/65 463/6 |
| 2004/0243299 A1* | 12/2004 | Scaer | G08G 1/202 701/522 |
| 2010/0332583 A1 | 12/2010 | Szabo | |
| 2011/0320966 A1 | 12/2011 | Edecker et al. | |
| 2012/0264520 A1 | 10/2012 | Marsland et al. | |
| 2014/0081437 A1 | 3/2014 | Knapp et al. | |
| 2015/0088474 A1* | 3/2015 | Frost | G06F 30/23 703/6 |
| 2019/0340883 A1 | 11/2019 | Arnone et al. | |
| 2021/0110667 A1 | 4/2021 | Washington et al. | |

* cited by examiner

Race historical data
1000

Race A
700a

| 924a | Start time |
| 922 | 0-60 speed |
| 1062a | Preracing performance rating |
| 328a | Owner |

Race B
700b

| 1212b | Track identifier |
| 1164b | Winner |
| 1162b | Coins wagered |

Race C
700c

| 1006c | GPS data |
| 312c | Winner vehicle identifier |
| 312d | Loser vehicle identifier |

FIG. 10 ized, with unique applications being released for increasingly niche industries. An industry which has been underserved by available computer technology is competitive automotive racing. There exists no efficient means in the art of organizing competitive races between drivers/competitors in vastly different geographic areas, much less ranking these drivers relative to one another. There is intense interest in competitive automotive racing among the more wealthy classes of the world, as well as interest in customizing stock performance vehicles to perform better on raceways. This interest in especially high in Arabia, including Saudi Arabia and United Arab Emirates, as well as Germany, Austria, and Switzerland where economies are strong and where countries have a history of car production.

COMPUTER-IMPLEMENTED METHOD, COMPUTER PROGRAM PRODUCT, AND SYSTEM FOR BROKERING ON-DEMAND COMPETITIVE RACING AND VIRTUAL CAR STORAGE

BACKGROUND OF THE INVENTION

Field of the Invention

This invention relates generally to on-demand mobile phone applications, and more specifically relates to mobile-device connected application (also known as "app") for smartphones configured to facilitate on demand street racing between competitors and generate a virtual simulation of vehicle by scanning a data structure.

Description of the Related Art

Mobile phone applications and on-demand product/service networks accessible by users via mobile devices are known in the art. Typically, these on-demand network systems connect consumers and providers for a wide variety of goods and services such as transportation and restaurant order/delivery services. Consumers, or users in these on-demand networks register for access to the network's offered goods and services which are delivered when the user places an order by an available provider.

Mobile phone applications are becoming more specialCurrently structured computer applications and methodology often pose risks, inefficiencies and limitations to the users. For example, there is no means in the art of tracking what modifications and after market parts have been added to performance vehicle before racing, leading to inefficiencies in the market, including a lack of knowledge on the part of consumers sufficient to form accurate beliefs as to the efficacy of performance-boosting parts and accessories, such as turbo chargers, suspension, headers, exhaust systems, drive trains, transmissions and the like.

The user (or competitor/driver) seeking this information is generally reliant on the antiquated methods of gathering information or word of mouth. Additionally, a driver's ability to acquire goods and services through an on-demand network could be augmented.

Other complications with typical on-demand racing networks are that they are often limited is geographic reach to only users in a particular metropolitan area or who make use of a particular race track. Currently available methods and software do not provide for relay on information in multiple languages or across international borders.

SUMMARY OF THE INVENTION

From the foregoing discussion, it should be apparent that a need exists for a computer program product, method and system for facilitating on-demand racing and virtual car storage/warehousing. Beneficially, such an on-demand computer program product, method and system would allow consumers to communicate and arrange competitive racing events, track performance during said racing events, award successful participants in the racing events, track historical modifications to vehicles raced in said events, wherein such methodology is centrally controlled by the on-demand network (or mobile application) wherein the user and provider establish accounts directly through the on-demand network to finance the procurement and delivery of the ordered goods and services.

The present invention has been developed in response to the problems and needs in the art that have not yet been fully solved by currently available apparati and methods. Accordingly, the present invention has been developed to provide a computer-implemented method for rendering a graphic representation of a vehicle within a virtual three-dimensional world, the operations of the computer program product comprising: initiating a shared online event on a first computing device via a communication network by delivering a request to a remote server to traverse a tree data structure created in computer readable memory on the remote server using 3D files input by a second computing device in logical connectivity with the remote server, the tree data structure representative of the vehicle; wherein the tree data structure includes a set of leaf nodes, each leaf node pointing to one of a parent node and root node, each leaf node containing a unique part identifier and a unique vehicular subsystem identifier, the unique part identifier exclusively associated with an automotive part installed on the vehicle and the unique vehicular subsystem identifier exclusively associated with a collection of unique part identifiers forming a subsystem of the vehicle; wherein all of the leaf nodes containing the same unique vehicular subsystem identifier are exclusively contained within a subsystem subtree data structure within the tree data structure; rendering a plurality of computer-readable 3D shapes in the virtual world identified within leaf nodes of the subsystem subtree data structure to create a drawn vehicular subsystem, each 3D shape contained in a separate computer-readable 3D file on the remote server; rendering a plurality of drawn vehicular subsystems to form the graphic representation of the vehicle in the virtual world by displaying, on the first computing device, via a display tool, the graphic representation of the vehicle, wherein each 3D shape is displayed separately in sequence as the tree data structure is traversed.

The 3D files, in some embodiments, are saved using Virtual Reality Markup Language (VRML). The computer-implemented method may further comprise sharing 231 account resources of a second computing device with the first computing device via the communication network, including the tree data structure.

Each 3D file may be uploaded to the remote server by a third computing device communicating logically on the communication network.

The computer-implemented method may further comprise: determining a winner and loser of the race by referencing a first performance metric exclusively associated with a competitor and a second performance metric exclusively associated with the competitor, wherein the winner and the loser, for each competitor, is determined by: multiplying the first performance metric by a first unique predetermined value to create a first performance value; multiplying the second performance metric by a second unique predetermined value to create a second performance value; adding said first performance value and said second performance value to create a performance total for each competitor; wherein the winner is the competitor exclusively associated with the highest performance total and the loser is the competitor exclusively associated with the lowest performance subtotal; calculating a relative performance rating of each competitor after completion of a race by: adding the total performance subtotals of each competitor to a multiplier of standard deviation to produce a performance total, multiplying the performance total by the remainder of total race wins minus total race losses to produce an adjusted performance total; and dividing the adjusted performance total by the total races of the competitor to produce the relative performance rating.

In various embodiments, each performance metric may be one of: 0-60 speed, a duration of time to complete the race, and GPS data indicated a distance traveled during said race.

For a race in which three or more competitors participate, the performance rating of each competitor may be calculated twice, the first as a winner of a race with another competitor immediately following said competitor in the rankings, if any; and second as the loser to another competitor preceding said competitor in the rankings.

The multiplier may be 2.

A second computer-implemented method is provided for rendering a simulation of a vehicle within a virtual three-dimensional world, the operations of the computer program product comprising: creating a virtual account for a competitor by collecting and storing the entity's name, city of residence, and telephone number in persistent computer readable storage in a database in connection with a plurality of other virtual accounts; creating a data structure accessible by an RDBMS exclusively associated with the competitor, said data structure comprising a rooted tree data structure with a root node comprising a unique identifier exclusively associated with an automobile model, wherein all interior nodes within the tree data structure are exclusively associated with an aftermarket automobile part added to the automobile model; and traversing rendering visually in virtual three-dimensions an automobile.

For a race in which three or more competitors participate, each competitor may be treated as a loser to the competitor finishing with better metrics.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which:

FIG. 10 is a data layout diagram illustrating automotive historical data in accordance with the present invention;

DETAILED DESCRIPTION OF THE INVENTION

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are given to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The embodiments of the present invention described herein generally provide for a system, computer program product, and a method for using an online network to facilitate, or broker, racing events between distantly-located competitors. Those individuals and entities desiring arrangement of competitive racing events referred to herein as consumers, drivers and/or competitors throughout this specification. Reference to consumers, drivers and/or competitors may include a tablet computer, smartphone, or DPD (data processing device) under the control of the consumer. Additionally, the community described herein may be referred to as a network, group, friends, or family, or racing professionals and these terms are synonymous as used throughout this specification. Consumers may also be referred to collectively hereinafter as users. The technology provider may be a DPD or system of DPDs, including server(s), operating independently of the consumers and providers, configured to facilitate the receipt, maintenance and provision of information between the consumers and providers.

Hence, in general terms, the present invention provides for a computer application adapted to broker, or facilitate, competitive racing between drivers who have incorporated with provider. The computer application also provides a methodology and data structure for tracking current and historical information relating to the modification of performance vehicles.

Determining to match one driver with another in a competitive racing can be a function of the provider's chosen radius around the route to the provider's final destination. A system for ranking drivers is also disclosed.

In some embodiments, the drivers 918 are matched based on performance ratings 344 determined by a ranking module 1112 as disclosed herein.

Figure 1A:
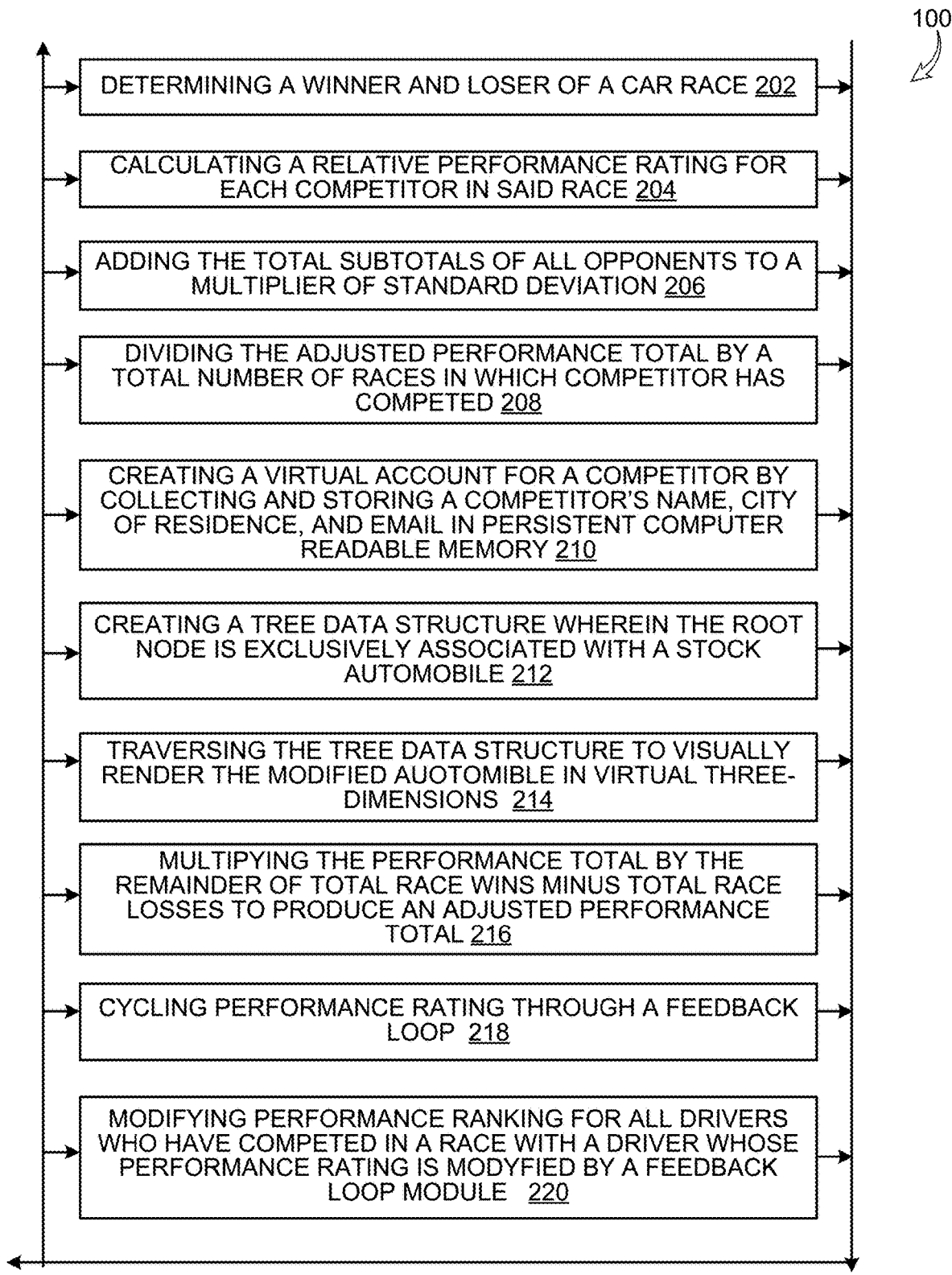
FIG. 1A is flow chart of a method of brokering on-demand competitive racing events, rendering a graphic representation of a vehicle, and facilitating virtual car storage in accordance with the present invention.
Figure 1B:
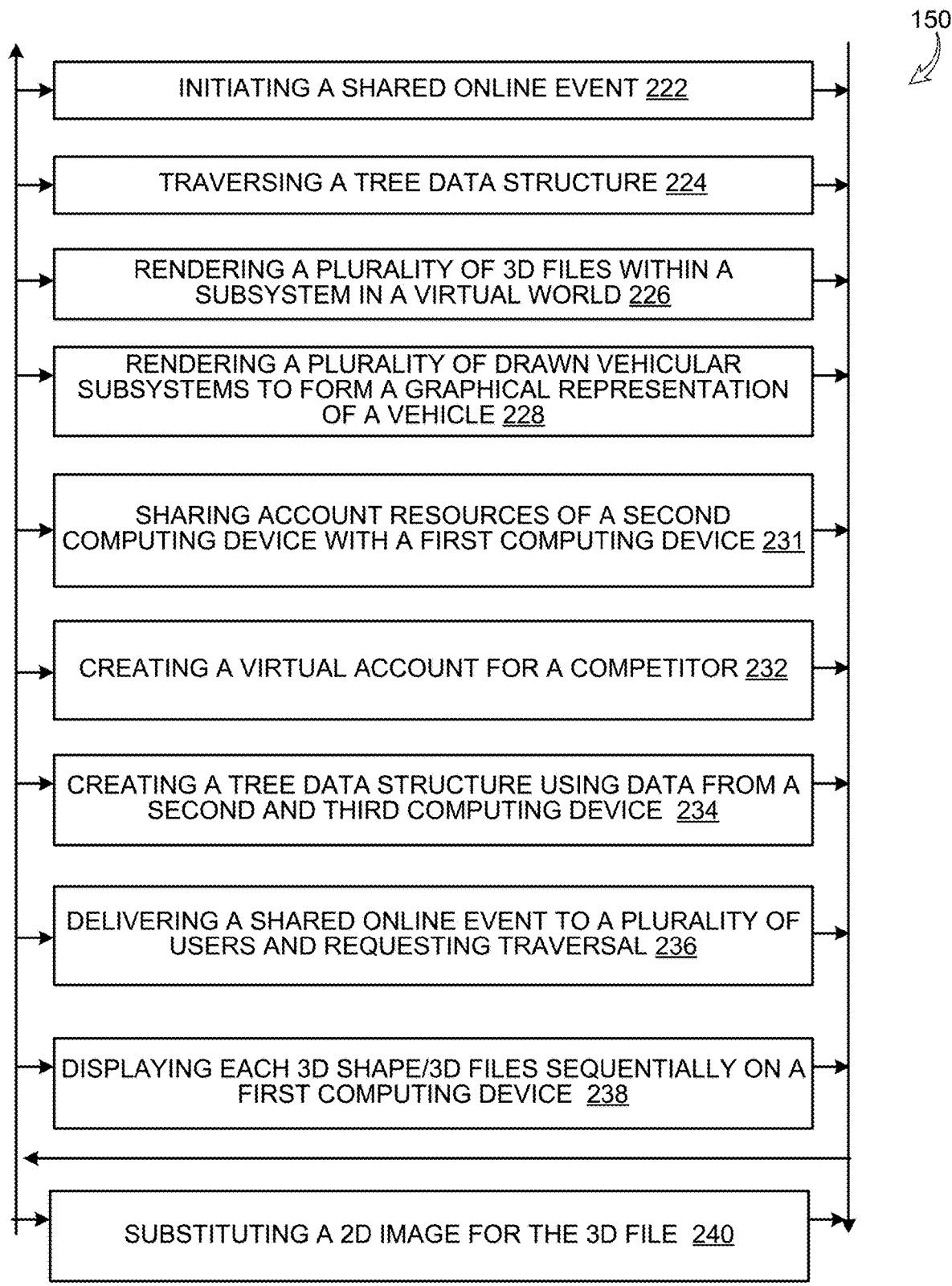
FIG. 1B is flow chart of a method of brokering on-demand competitive racing events, rendering a graphic representation of a vehicle, and facilitating virtual car storage in accordance with the present invention.

Accordingly, as illustrated in FIGS. 1A-1B, a flow chart of a method 100, 150 of brokering on-demand competitive racing events and virtual car storage.

A winner and loser of the race for each GPS data gathered is determined 202. The winner 1164 is determined 202 to be the driver of a vehicle which completes a track 1220 of predetermined size and shape in the least amount of time relative to one other driver. In various embodiments, the amount of time which elapsed for completion of a race is determined as a function of a time measured by an independent third party on the track and a GPS system within the vehicle.

In competitions/races with a plurality of vehicles, for the purposes of calculating a relative performance rating, each driver in the race is determined to be a winner 1164 or loser relative to every other driver in the race. For instance, in a race with two drivers, the amount of races would be calculated as two.

In race with three drivers, the amount of races would be calculated as three. In a race with four drivers, the amount of races would be calculated as six, and in a race with five drivers, the amount of races calculated would equal ten. In a race with six drivers, the amount of races is calculated as 15, which includes one race for every two drivers in the group.

A relative performance rating is determined by a ranking module 1112 for each competitor based on either all collective GPS data gathered for the drivers in a race 700 and/or specific metrics within the GPS data 1006 or within historical records 1000, including the identity of the winner 1164 and loser of the race 700, or by referencing two or more performance metrics, each performance metric exclusively associated with one of a first driver 918 and a second driver 918, wherein the winner may be the competitor exclusively associated with a fastest performance metric and the loser is the competitor exclusively associated with the slowest performance metric.

The relative performance rating may be calculated 204 as a relative performance rating of each competitor after completion of a race by: adding 206 the total performance subtotals of all opponents to a multiplier (or fraction) of standard deviation to produce a performance total, multiplying 216 the performance total by the remainder of total race wins minus total race losses to produce an adjusted performance total; and dividing 208 the adjusted performance total by the total races of the competitor to produce the relative performance rating.

The performance metric may be the 0-60 mph speed and duration of time to complete the race, or may be expressed in kilometers. For a race in which three or more competitors participate, the performance rating of each competitor is calculated 204 against every other competitor in the race, the first as a winner of a race with another competitor immediately following said competitor in the rankings, if any; and second as the loser to another competitor preceding said competitor in the rankings.

In some embodiments, each performance metric is multiplied by a unique predetermined value created to adjust the overall importance of said performance metric to performance ratings, this multiplication creating a first performance value for each driver. For instance, the unique predetermined value may be 0.00 to 1.00, or may be a percentage of the disparity in identical performance metrics between drivers/competitors to the same race. For instance, for a winning first driver/competitor who finished his race in 60 seconds versus a losing, second driver/competitor who finished in 70 seconds, the unique predetermined value may be 0.91 or 0.91 multiplied by ten (the disparity between competitors).

All of the performance values for each driver/competitor to a race may be totaled to determine a performance subtotal for each competitor/drive. The driver/competitor with the highest, or lowest, performance total may be considered the winner of the race.

The steps of the method may be embodied as a computer program product comprising a computer readable medium having computer usable program code executable to perform operations for creating a car within a virtual three-dimensional world by: creating 210 a virtual account for a competitor by collecting and storing the entity's name, city of residence, and telephone number in persistent computer readable storage in a database in connection with a plurality of other virtual accounts.

The computer-implemented method may also include creating a data structure 212 accessible by an RDBMS exclusively associated with the competitor, said data structure comprising a rooted tree data structure with a root node comprising a unique identifier exclusively associated with an automobile model.

Within this tree data structure, the interior nodes and leaves may be exclusively associated with an aftermarket automobile part added to the automobile model; and traversed to rendering visually in virtual three-dimensions by the vehicle module 1116, the aftermarket automobile by displaying the aftermarket automobile as a collection of automotive parts, each part defined in one leaf of the tree data structure.

These calculations may be determined by a winner-loser submodule 1156 further described below.

FIG. 1B is flow chart of a method 150 of brokering on-demand competitive racing events, rendering a graphic representation of a vehicle, and facilitating virtual car storage in accordance with the present invention.

The 3D files stored in storage 902 on the server 902, which server 902 is remote to the computing device (i.e., DPD) upon which the virtual rendering of the vehicle is displayed. The 3D files may be formatted in VRML format (Virtual Reality Markup Language). In those cases in which a 3D file referenced in a node 242 is unavailable in storage 902, a 2D photograph of a generic component correlated with said part is substituted 240 by the vehicle module 1116 or method 150.

In various embodiments, a shared online event file on the server 902 is initiated 222 (or created 222) in response to an owner 328 prompting the server 902 to create the shared online event, as further described below in relation to FIG. 7. A request to initiate 222 the shared online event may be relayed from a first computing device under the control of an owner 328 to the server 902. This request made over a WAN or communication network may comprise an instruction to the remote server 902 to traverse 224 a tree data structure 230 in memory 906. The shared online event file is created to comprise a tree data structure 230. The shared online event file is displayed to other owners 328 on separate computing devices who may add secondary, tertiary (and so on) tree data structures 230*b-c* to the shared online event file using a tool (or browser) configured to allow said secondary owners 328 to add a tree data structure 230*b* to the shared online event.

The 3D files referenced in each node of a subtree of the tree data structure 230 (further described below) may be rendered 226. Each 3D file exclusively associated with a subsystem is sequentially rendered on a display of the first computing device until all 3D files exclusively associated within a subtree and with a subsystem are rendered 228, at which time additional subsystems are rendered 228.

Every owner 328 is prompted to create 234 a tree data structure 230 which may shared with others creating a shared online event, which shared online event may be delivered 236 to other owners 328 satisfying a predetermined selection criteria, or instance owners having performance ratings within a predetermined range set by the owner initiating 222 the shared online event using virtual controls 306.

For each tree data structure 230 which is added to a shared online event file (i.e., shared online event), each 3D file referenced in nodes of said tree data structure 230 is rendered 238 graphically on display on an owner's 328 computing device. These 3D files are rendered sequentially for each component within a subtree representing a vehicular subsystem (i.e., subsystem) within the tree data structure 230.

Figure 2:
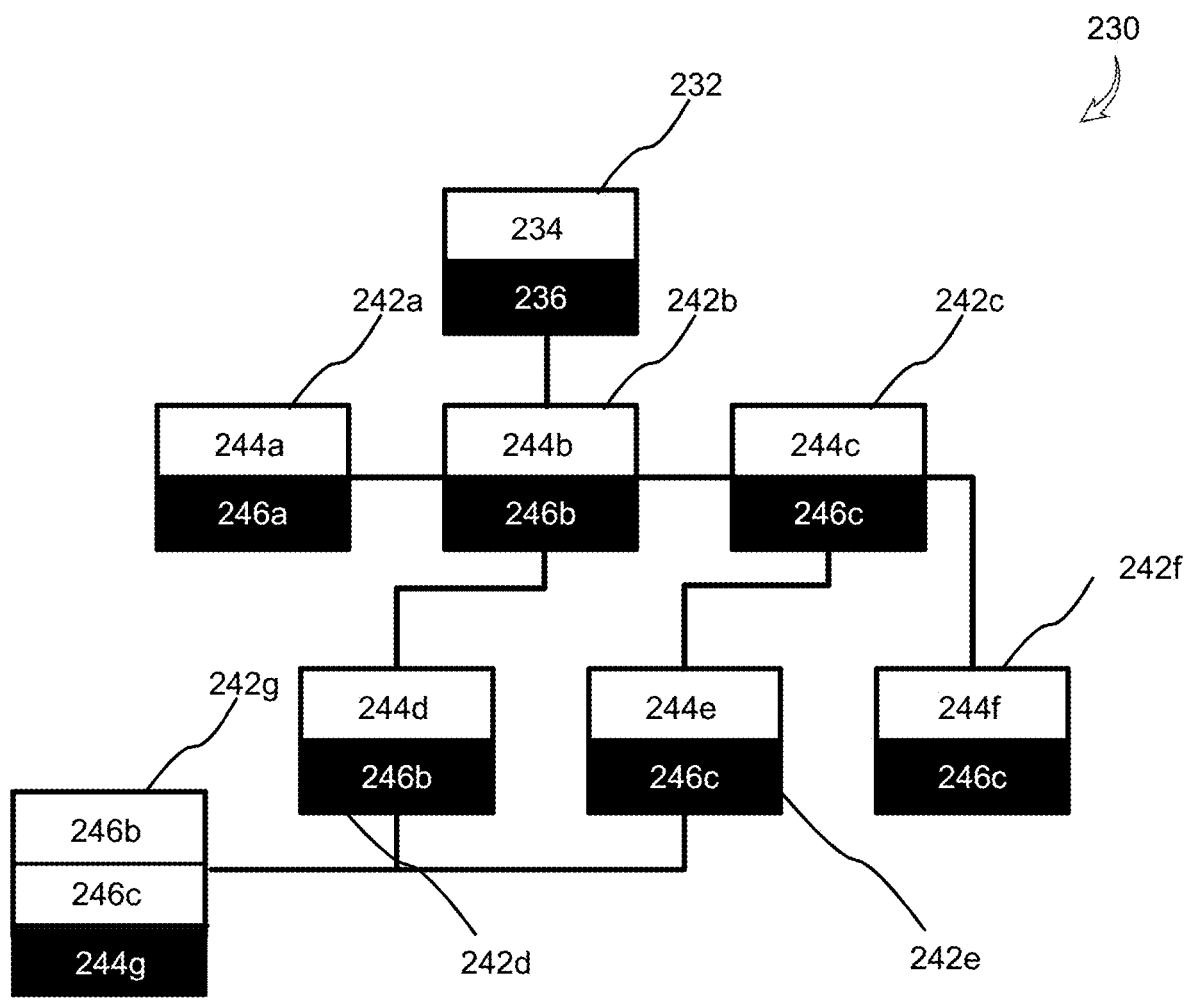
FIG. 2 is an exemplary diagram illustrating a tree data structure in accordance with the present invention.

FIG. 2 is an exemplary diagram illustrating a tree data structure 230 in accordance with the present invention.

The tree data structure 230 comprises a root node 232 which includes a value exclusively associated with a vehicle 312 such as a VIN and an ID 236 exclusively associated with one of a driver 918 and an owner 328.

The tree data structure additionally comprises a plurality of leaves 242 (or nodes) which each comprise a value 244 exclusively associated with a component used to assemble said vehicle 312. The leaves 242 may also comprise a system identifier 246 exclusively associated with a subsystem within the vehicle 312, such as the drive train, climate control, suspension, frame, ergonomics, and the like.

In various embodiments, the leaf 242*g*, may comprise a plurality of system identifiers 246*b*, 246*c* for those parts which may form part of a plurality subsystems. In various embodiments, the tree data structure 230 comprising an encrypted blockchain or permissioned ledger (or NFT) controlling ownership of vehicle 312.

A separate tree data structure is stored in persistent storage in a DBMS for each vehicle in a driver's virtual garage 322. The root node is exclusively associated with a stock performance vehicle 332. Parts and accessories added to the stock performance vehicle 332 are exclusively associated with leaf nodes 242, including categories/subsystems of parts/components 1102 (such as drive train, suspension, and the like).

Figure 3:
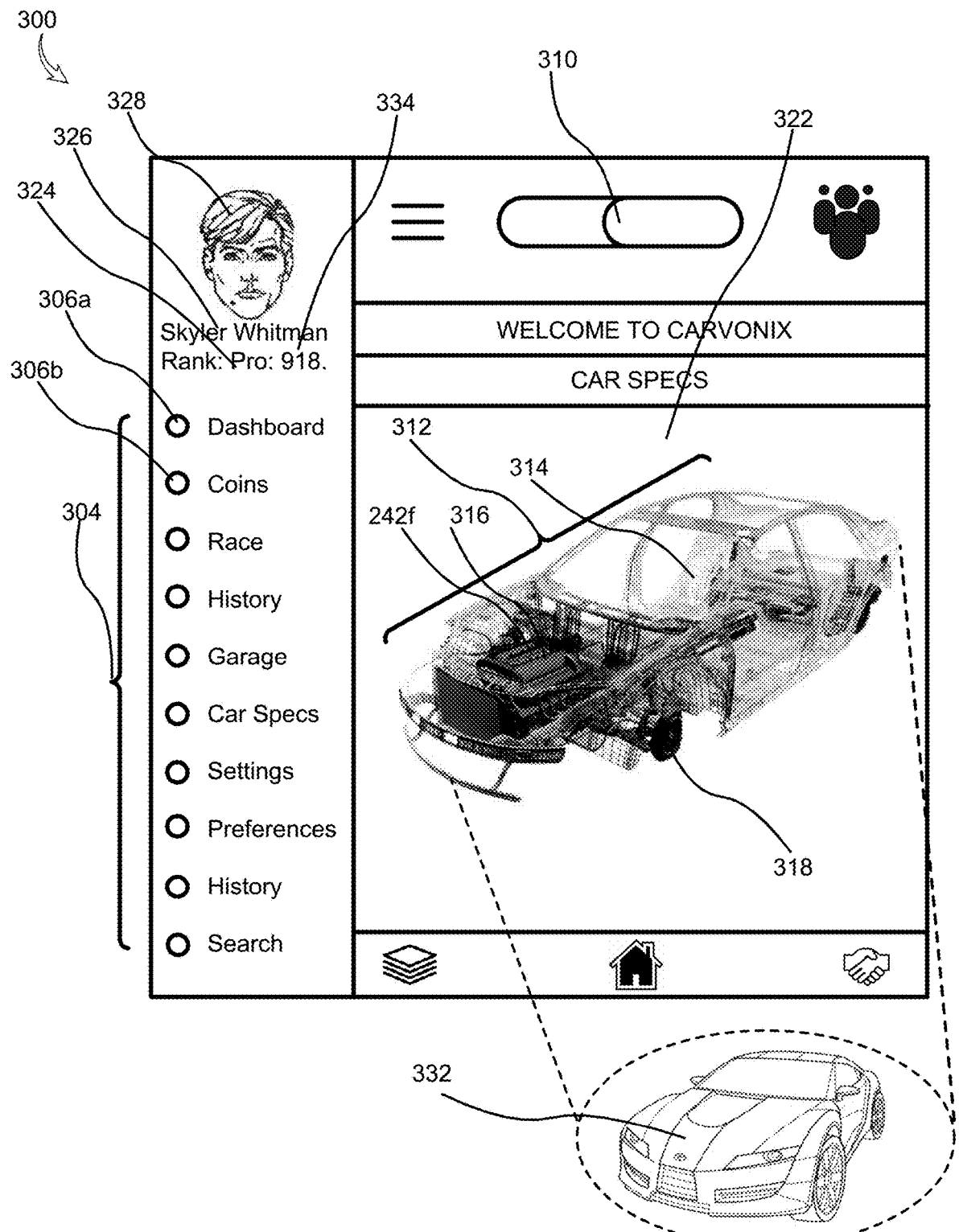
FIG. 3 is user interface displayed to a driver in accordance with the present invention.

FIG. 3 is user interface 300 displayed to a driver in accordance with the present invention. A real-world vehicle 332 is rendered virtually in the user interface 300 by traversing a binary tree data structure 230 containing information about aftermarket parts and accessories installed on the vehicle 312, 332.

Each owner 328 is incorporated 232 into a marketing network comprising virtual accounts of individuals and entities who have registered with the server 902 under the control of a technology provider. For the purposes of this disclosure, the terms "incorporate" and "incorporation" denote the act of formally credentialling an owner 328 for use of a computer system such as system 800 and others referenced herein. Owners 328 may be associated through social media or live within close geographic proximity to one another, or may come to know and associate with one another using any system or method taught herein.

Owners 328 are individuals or entities who come to be become incorporated when they create accounts with the server 902 operating under control of a technology provider by uploading personal identifying information 1108, including one or more of: an address, an email address, a telephone number, a VIN number of a vehicle 234, and the like. In typical embodiments, the registration takes place via a browser, but may also be sent to the server 902 using programs well-known to those of skill in the art, such as Microsoft Outlook, Thunderbird, Yahoo! Mail, and the like. In other embodiments, the owners 328 are incorporated by an incorporation module 1132 by receiving personal information via an API from a social media provider such as Google®, Facebook®, Twitter®, Instagram®, Snapchat®, or other social media providers known to those of skill in the art using means known to those of skill in the art. In this manner, a virtual account for the owner 328 is created 210.

Like the drivers 918, the owners 328 may comprise any person, company, or organization that is potentially a merchant of another person, company, or organization.

The owners 328 may comprise any system, apparatus, computing device, or computer program running on one or more data processing devices (DPDs), such as a server, computer workstation, router, mainframe computer, or the like. In various embodiments, the DPD comprises one or more processors 114. The processor is a computing device well-known to those in the art and may include an application-specific integrated circuit ("ASIC"). Each owner 328 is exclusively associated with an owner ID 234, which may be stored in the root node of the tree data structure 230.

Virtual controls 306 are spaced across the user interface 300 in a control panel 304, including one or more of radio buttons, dialog buttons, and drop-down menus.

Owners 328 may be exclusively associated with a performance rating 334 and/or a rank 324. In some embodiments, vehicle 312 is exclusively associated with a vehicular performance rating calculating using the same methodology as the performance rating 334 of the owner 328. In various other embodiments, the driver 918 is exclusively associated with a driver performance rating 622.

Indicated at 342 is the engine powering the vehicle 312. The specifications for this engine are written into the tree data structure 230 in node 242*f* When the virtual rendering 312 is generated, an image (or 3D computer-readable CAD file) of the engine 316 is incorporated into an CAD assembly file showing the engine 316 digitally rendered. This image may be encoded into to the tree data structure 230 in node 242*f*, by way of example. Thus, each virtual rendering 312 is a compilation of CAD files found in a tree data structure 230 or otherwise stored in the RDBMS or DBMS 904, allowing owners 328 to easily interchange parts within their virtual renderings 312.

The node 242f comprises a part number 244f and subsystem identifier 246c. The node 244e also comprises the same subsystem identifier 246c. This is because, in the shown example, the subsystem identifier 246c is exclusively associated with, and indicative of, the power train. The part number 244e may indicate other parts also exclusively associated with the power train, such as the transmission or rear differential.

Indicated at 314 is a tire which would form part of the suspension subsystem 246b.

An owner 328 may toggle between different vehicles 312 within a virtual garage 322 under the owner's 328 control using virtual controls 310.

Figure 4:
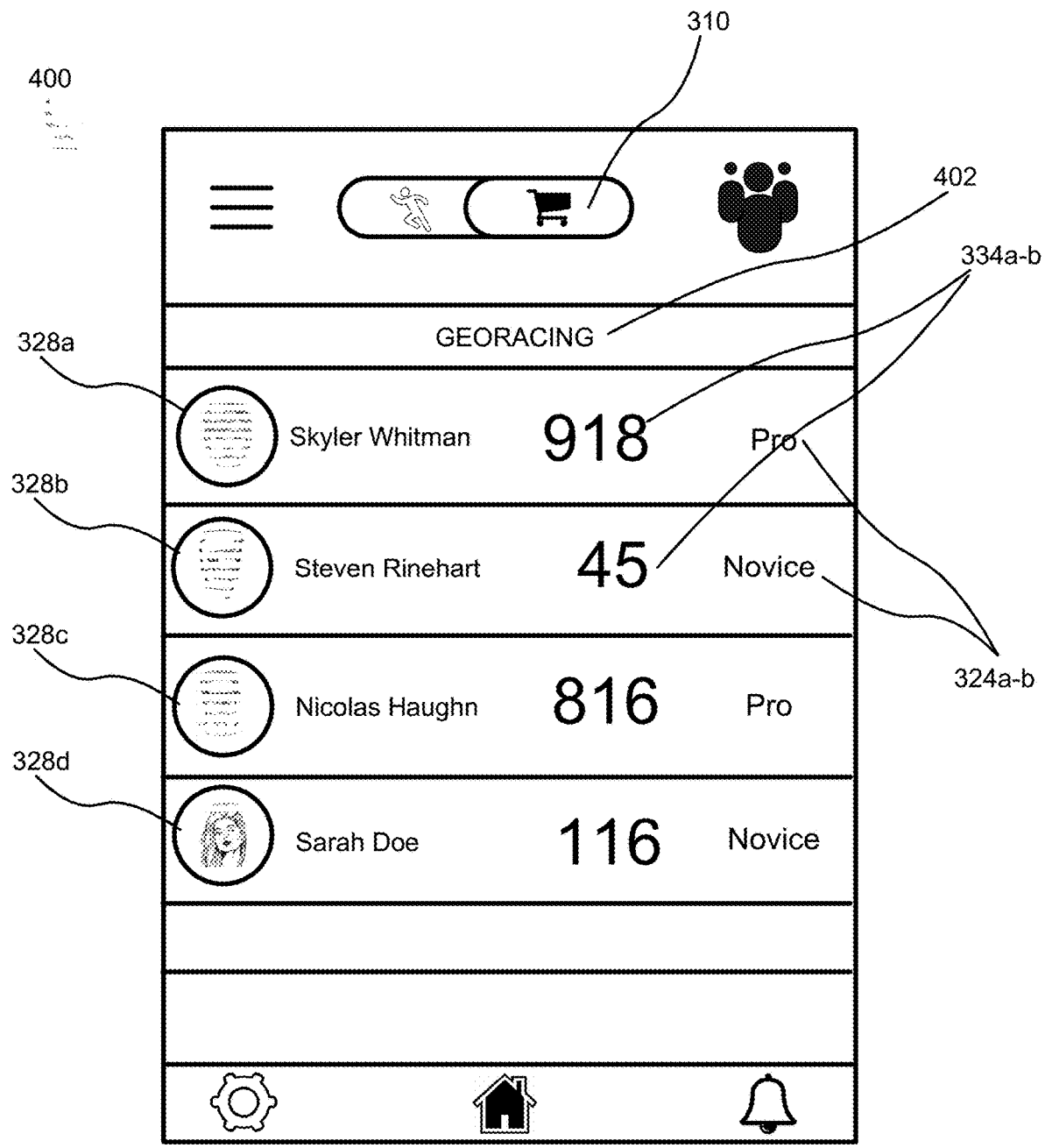
FIG. 4 is user interface displayed to an owner in accordance with the present invention.

FIG. 4 is user interface 400 displayed to an owner 328 in accordance with the present invention. Owners' 328 or drivers' 918 performance ratings 334 are displayed along with an amateur or professional status or rank 324.

A plurality of owners 328a-d are shown in the user interface 400. The owner 328a is prompted to select one or more other drivers 328b-d to challenge to a race on a georacing page 402 rendered by a geocoding subroutine 1161.

Figure 5:
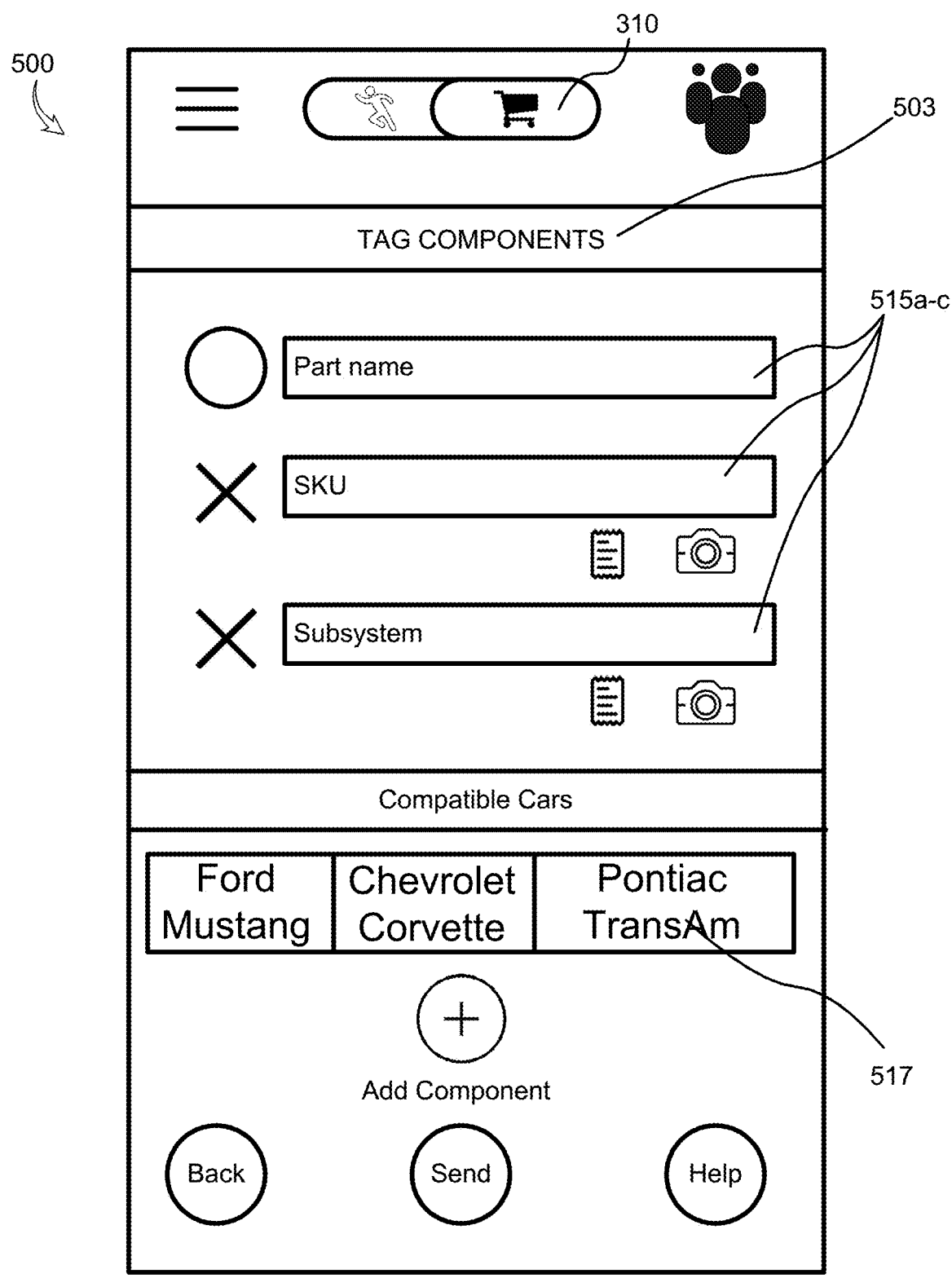
FIG. 5 is user interface displayed to a driver in accordance with the present invention.

FIG. 5 is user interface 500 displayed to a driver in accordance with the present invention. Parts may be added to the tree data structure 230.

The user interface 500 comprises a plurality of fields 515a-c which an owner 328 uses to input data about components 1103, such as an engine 316, which form the vehicle 312.

In various embodiments, the user interface 300 includes virtual buttons 517 which allow an owner 328 to specific base characteristics for a vehicle 332 to be added to the owner's 328 virtual garage. The garage module 1118 creates a separate computer-readable file in the DBMS 904 for each virtual garage, the separate computer-readable file comprising the tree data structures 230 for each vehicle in the virtual garage 322.

Figure 6:
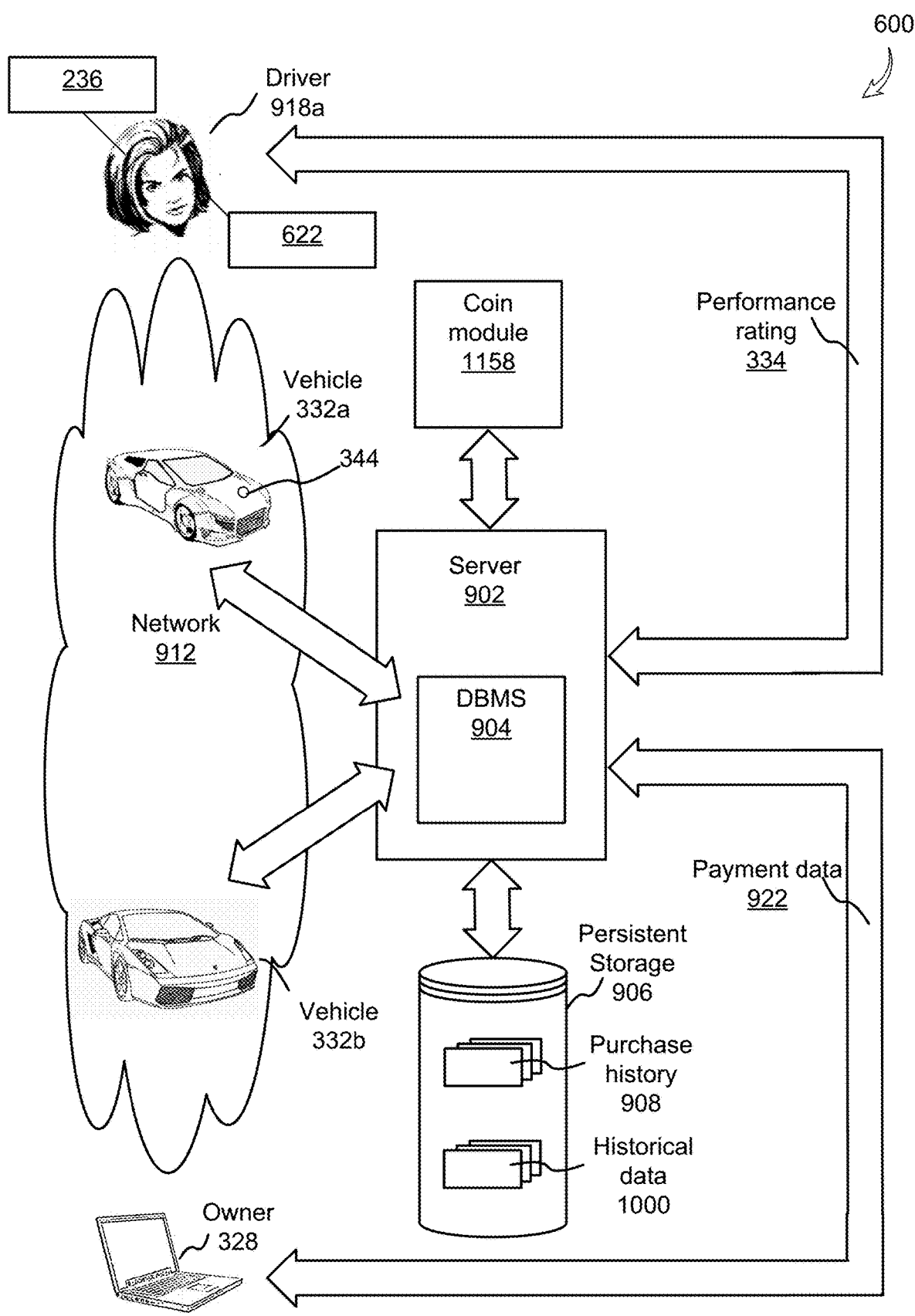
FIG. 6 is an entity-relationship diagram illustrating data flow between entities in accordance with the present invention.

FIG. 6 is an entity-relationship diagram illustrating data flow 600 between entities in accordance with the present invention.

While racing, vehicles 332 are in logical connectivity with a server 902. The server 902 may include a plurality of mobile computing devices having processors. In one aspect, the one or more processors can include programming to make to make determinations in accordance with the steps of the methods taught herein. The drivers 918 may comprise an owner 328 or any person who drivers the vehicle 332 for the which a virtual rendering 312 is created.

Typically, the server 902 comprises one or more central processing units executing software and/or firmware to control and manage the other components within the system 900. In one embodiment, the server 902 comprises hardware and/or software more commonly referred to as a Multiple Virtual Storage (MVS), OS/390, zSeries/Operating System (z/OS), UNIX, Linux, or Windows system 100.

The server may comprise a server cluster with firewalls, load balancer, and database servers having Apache® and/or other software applications well-known to those of skill in the art. The server 902, in the shown embodiment, comprises a database management system (DBMS) 904 or relational database management system (RDBMS) 904, such as Oracle, MySQL, SQL, FireBird, IBM DB2®, or the like.

Each of the vehicles comprises a GPS tracker 344 as known to those of skill in the art. These GPS trackers 344 are positioned within the vehicle within six inches of the forward most surface of the vehicle 332 in some embodiments. In other embodiments, the distance between the GPS tracker 344 and the forward most edge of the vehicle is saved in computer-readable memory in the tree data structure 230 in a node 242 exclusively-associated with the GPS tracker 344. The GPS tracker 344 is in logical communication with the server 902 via a network 912, including a WAN or LAN. The GPS tracker 344 relayed GPS data 1006 to the system 800 further described below.

In various embodiments, an owner 328, which may be a DPD as shown, arranges a physical race between two vehicles 332a-b and/or two drivers 918. Wagers are placed on the race by the drivers 918, owners 328 and/or other third-party owners 328 not participating in the race.

A coin module 1114 debits virtual tokens, or coins 1361, from an owner's 328 account and escrows them on the server 902 under the control of the technology provider.

Historical data 910 is stored in persistent storage 906, which historical data 910 may comprise historical performance ratings, purchase history, and the like.

The server 902 is in logical communication with one or more owners 328 through a networked environment 912 (i.e., a communication network), such as local area network (LAN) or wide area network (WAN). The server 902 may communicate with owners 328 and/or drivers 918 by sending queues, race requests 383, and commercial offerings, using variations of the Simple Mail Transfer Protocol (SMTP), Internet Message Access Protocol (IMAP), Post Office Protocol (POP), or other protocols well-known to those of skill in the art.

Figure 7:
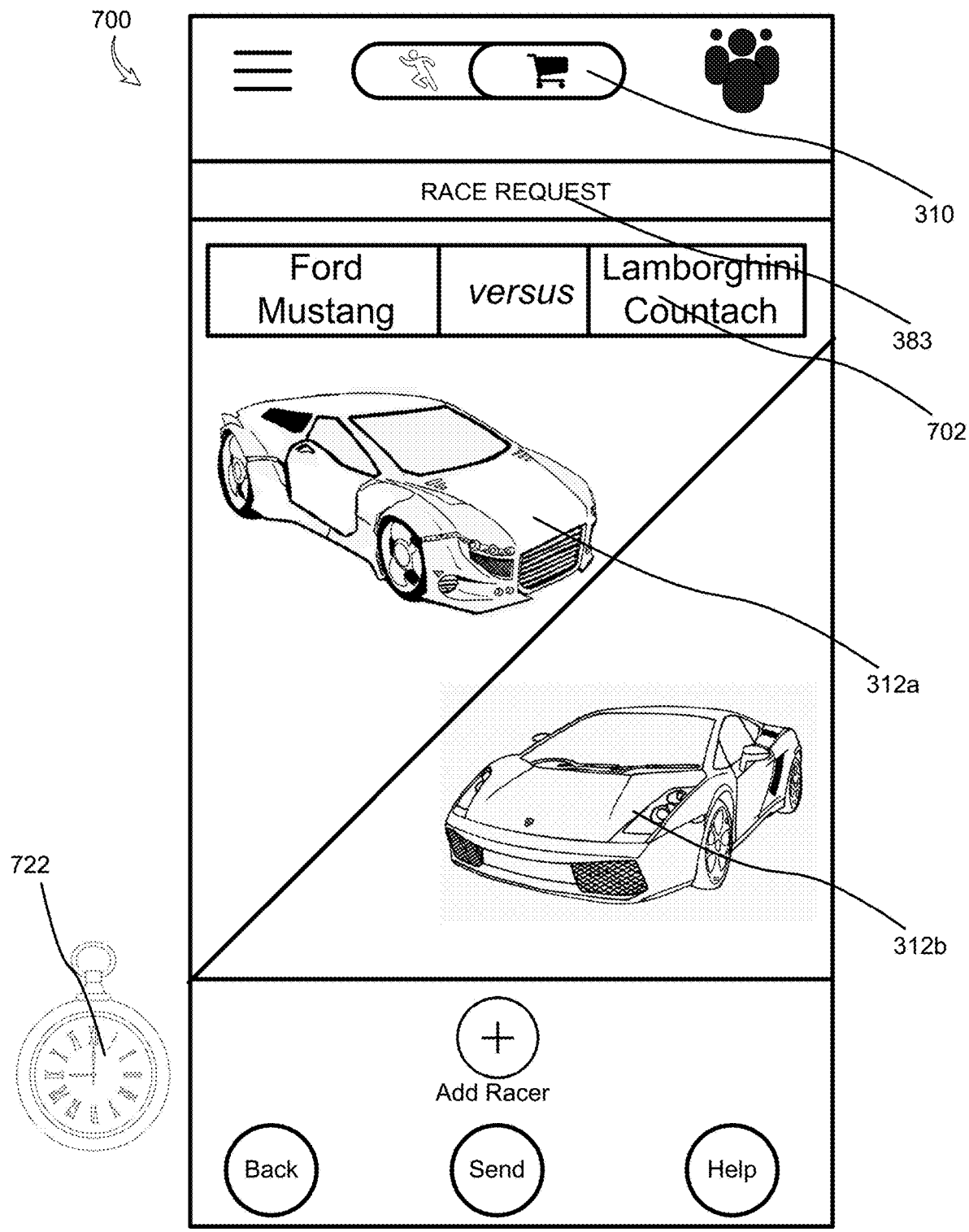
FIG. 7 is user interface displaying specifics of a virtual race 700 to a plurality of drivers in accordance with the present invention.

FIG. 7 is user interface displaying specifics of a virtual race 700 to a plurality of drivers in accordance with the present invention.

The specifics of race 700 include virtual renderings 312a-b of the vehicles 332 competing and the names of the vehicles 702.

Competitor's vehicles are matched within a user interface based on performance ratings of the vehicles. In some embodiments, a user or owner 328 selects the vehicles he or she wishes to invite to join the race 700 using the shown user interface. Selection of vehicles 312 to compete in a race 700 is controlled by a racing module 1120. In various embodiments, the system 800 receives a payment authorization 1106 for the purchase of coins from a third-party merchant processor.

In various embodiments, owners 328 may be prompted to create a new race 700 by initiating 222 a shared online event. Shared online events 383 may comprise new computer files or data types or alternatively may be added to a race 700 already existing between one or more owners 328.

In various embodiments, a shared online event is created by an owner 328 who activated virtual controls 304 to deliver 223 a request to a remote server 902 to create a shared online event 383 in computer-readable memory and to traverse 224 the tree data structure 230 comprising 3D files of VRML objects (i.e., 3D shapes), which 3D files may be uploaded to the remote server 902 by a third-party computing devices under the control of part manufacturers or other owners 328.

Additional owners 328 may add vehicles, or tree data structures 230 representative of vehicles, to the share online event in computer readable memory. Any owner adding a vehicle to a shared online event commits himself financially to performing the race 700 and wagering one or more token on the race 700. A plurality of owners 328 are displayed the rendered 228 tree data structures 230 on the displays of various computing devices.

In some embodiments, data resources within an owner's 328 account in addition to the tree data structure 230 associated with said owner 328 may be shared 231 with the owner 328 initiating 222 the shared online events, including performance ratings and historical data 1000.

In other embodiments, drivers 918 who have not yet been invited to the race 700 are invited via social media in response to a race request 383 being generated. Drivers 918 may be matched with an owner 328 already acting to realize a race 700.

In some embodiments, a single race request 383 is stored in computer-readable memory as a readable-file while in other embodiments, multiple race requests/shared online events 383 are correlated or exclusively associated with an owner 328. Multiple race requests 383 may be exclusively associated with a geographic area for browsing by owners within said geographic area or within a larger scheduling file stored in an RDBMS 904.

Advantageously, this real-time authorization provides greater flexibility to the users who can adjust the transaction matches to include possible matches outside the preference parameters which the processor uses to parse the possible match data.

It will be appreciated that other data besides prospective delivery destination proximity and authorized approval of a provider can be used to adjust the potential transaction match data.

Figure 8:
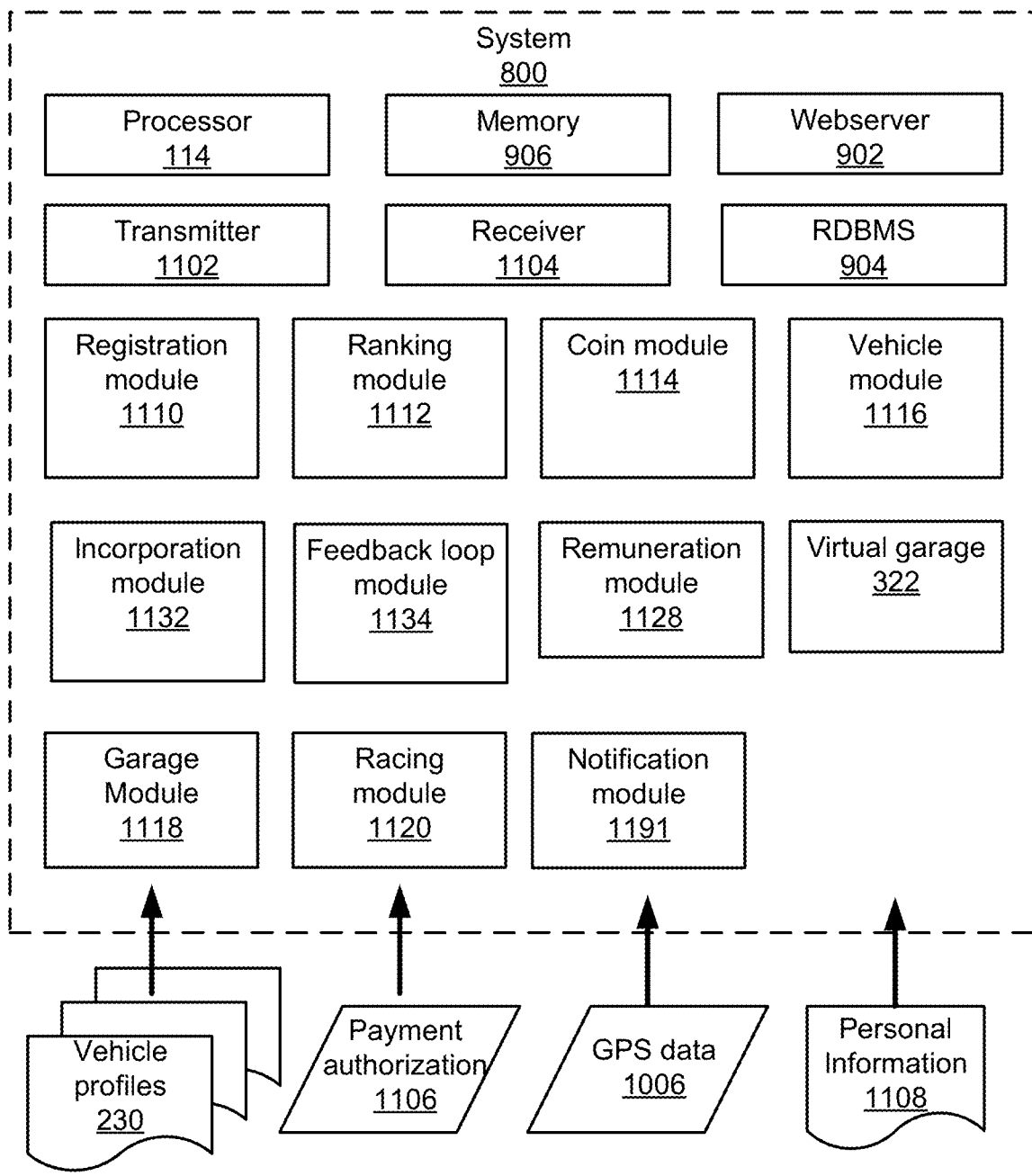
FIG. 8 is a block diagram illustrating modules of a system in accordance with the present invention.

FIG. 8 is a block diagram illustrating modules of a system 800 in accordance with the present invention.

In some embodiments, the raking module 1112 may also modify a Boolean winner value exclusively associated with a driver which is evaluated as true if the driver is determined 202 to be a winner as follows:

```
int ranking(char driver_name, char opponent_name, int winner_value)
{
  const int PREDETERMINED_CONSTANT=1;
  int winner_value;
  boolean winner_value=0;
  for (winner_value<PREDETERMINED_CONSTANT;
  winner_value++)
  return (winner_value);
}
```

In various embodiments, the system 800 comprises a feedback loop module 1136. The feedback loop module 1136 is adapted to identify outlying drivers 918 in races and/or vehicle 312 which either: (1) win one more races against competitors with higher performance ratings (as rated and existing before the race); and (2) loose one or more races against competitors with lower performance ratings (as existing before the race). The feedback loop module 1136 is fed as parameters the following value for each race: the winner value Boolean; the VINs 234 of the vehicles 332 competing in the race; and/or the ID 236 exclusively associated with each driver 918; and/or the performance ratings for each vehicle 312 and/or driver 918 competing in the race as they were determined before the race commenced.

Upon receiving these parameters, if a driver 918 is determined to have outperformed or underperformed by winning or losing a race he was predicted by his performance ratings not to win or lose, an additional calculation is made to the driver's 918 performance rating.

For those cases in which a driver wins a race he was predicted to lose, the driver's 918 performance rating is subjected to a feedback determination adjustment wherein said driver's 918 performance rating is adjusted (or modified 220) upwards by a fraction of the differential between the pre-race performance ratings 1062 of both drivers 918. For those cases in which a driver 918a loses a race he was predicted to win, the driver's 918a performance rating is adjusted (or modified 220) down by a fraction of the differential between the pre-race performance ratings of both drivers 918 in the race. In this manner, performance ratings are cycled 218 through a feedback loop.

Additionally, for each driver 918a whose performance rating is subjected to a feedback determination adjustment increasing said driver's 918a performance rating, all previous drivers 918 who have competed against driver 918a may receive the same adjustment to their performance ratings, divided by an amount of time which has elapsed since said previous driver 918 competed with driver 918a. For instance, the upward adjustment which a previous driver 918 receives may be the amount driver 918a received, divided by the number of days, months, or years which have elapsed since said driver 918 raced driver 918a.

The same is true for each driver 918a whose performance rating is subjected to a feedback determination adjustment decreasing said driver's 918a performance rating. All previous drivers 918 who have competed against driver 918a may receive the same adjustment to their performance ratings, divided by an amount of time which has elapsed since said previous driver 918 competed with driver 918a. For instance, the downward adjustment which a previous driver 918 receives may be the amount driver 918a received, divided by the number of days, months, or years which have elapsed since said driver 918 raced driver 918a.

The registration module 1110 registers owners and drivers 918 with the server 902. The coin module 1114 debits virtual coins, tokens, or monies from an owner's account and escrows said coins on the server 902.

The vehicle module 1116 renders the vehicle 312 by traversing the tree data structure 230, and may display vehicular components and/or subsystem one at a time on a display on computing device under the control of an owner 328. The remuneration module 1128 determines based on winning and losing data for a race 700 which owner 328 should be awarded funds held in escrow by the coin module 1114.

In some embodiments, the server 902 collects payment from owners 328 after race request 383 is created, then remunerates the owners 328 participating in the race 700 in accordance with a predetermined payment schedule mutually agreed upon by the participating owners 328.

The racing module 1120 receives data transmitted from a vehicle 332 during a race 700 including GPS data 1006. The system 800 may include a receiver 1104 and a transceiver 1102 or communicating via a WAN or LAN 912.

The notification module 1191 sends/relays notifications to owners that race requests 383 have been created or that requests to join a race 700 been received by the technology provider, in some cases via SMS.

A notification module 1191 is also shown and may be configured to relay the name of the driver 918 to owners 328 participating in a race 700. The notification module 1191 may also be configured to relay the vehicles 312 to participating owners 328.

Figure 9:
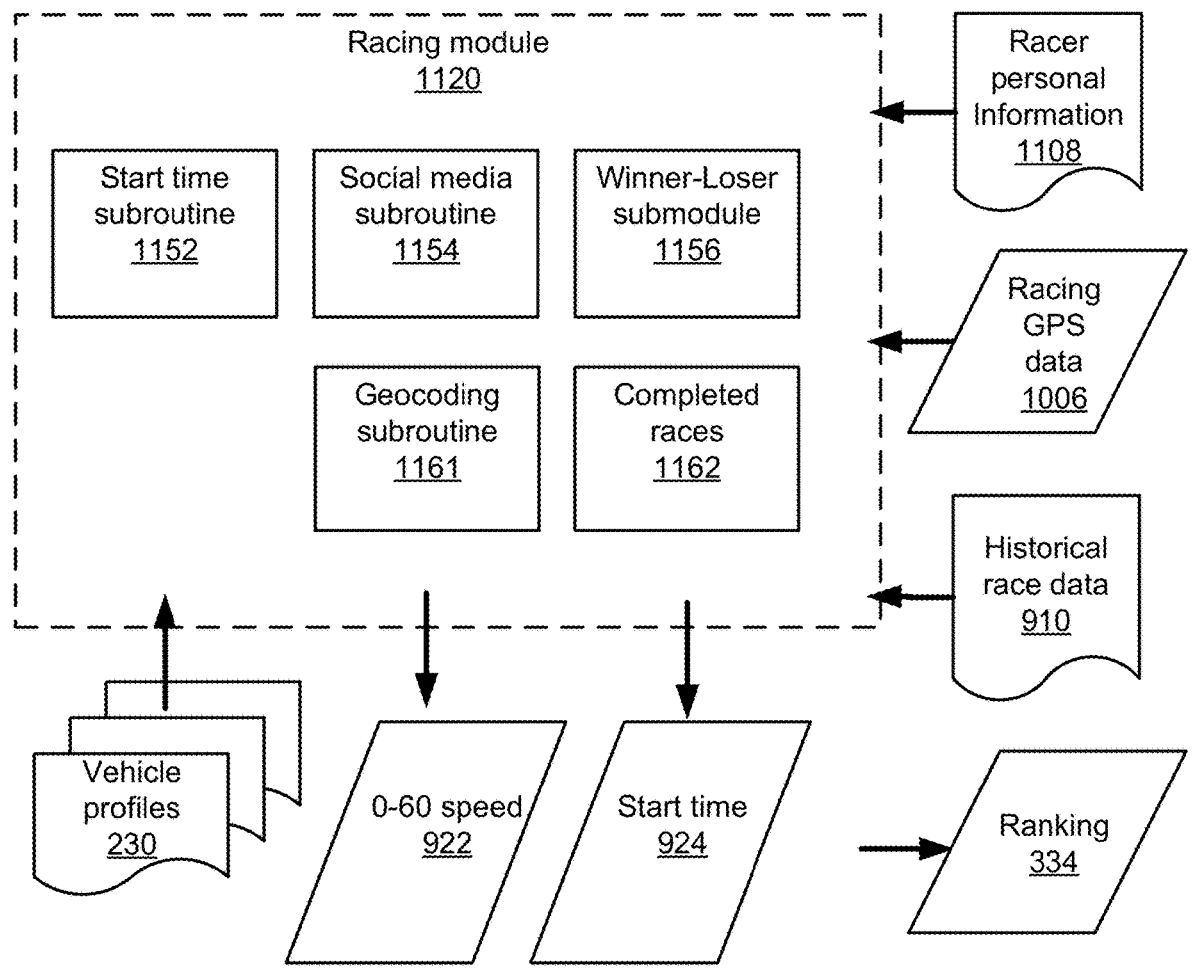
FIG. 9 is a block diagram illustrating modules of a system in accordance with the present invention.

FIG. 9 is a block diagram illustrating a racing module 1120 in accordance with the present invention.

The racing module comprises a start time subroutine 1152 which calculates the exact moment a race 700 begins and may store said time in a float. The start time may be calculated when a timer 722 begins which in logical communication with the server 902 via a network 912.

The winner-loser submodule 1156 makes calculations necessary to determine which of every two drivers 918 within a race 700 is the winner. Using GPS data 1006 and data from the timer 722, a 0-60 speed 922 is calculated. The start time 924 originates with the timer 722. The geocoding subroutine (or submodule) 1161 measures, using the GPS data 1006, the distance which each driver 918 to a race 700 covered during the period of the race and determines which GPS tracker 344 crossed an end point 1420, or finish line, first.

The geocoding subroutine 1161 is adapted to draw the track which was completed using information fed to the racing module 1120 via an API such as Google® Maps. The completed races module 1162 is configured to create an historical record 1000 in computer-readable memory 906.

The geocoding subroutine 1161 may convert GPS coordinates to mailing addresses or physical addresses, and vice versa, using means known to those of skill in the art, including APIs. Geocoding is the computational process of transforming a description of a location (textual information on addresses or places) to a location on the Earth's surface (spatial representation in numerical coordinates). The geocoding subroutine 1161 may comprise an API such as the Google Maps Geocoding API™, Google Maps Direction API™, Google Maps Javascript API™.

Geolocation information, as used herein, denotes information sufficient to identify in GPS coordinates and the static location of the start point 1402 and end point 1420 of a track 1200-1260. This location, expressed in GPS coordinates, is the geolocation (or, alternatively, geolocation information or geostatic location).

FIG. 10 is a data layout diagram illustrating automotive historical data 1000 in accordance with the present invention as created by the completed races module 1162.

The historical data 1000 includes records for every race 700 completed by an entity registered with the server 902, including races 700*a-c*. These records may comprise a track identifier 1212 which is a unique identifier exclusively associated with the track upon which the race 700*b* took place. These records 700*a-c* may also comprise a unique winner identifier 1164*b* exclusively associated with the winning driver 918 of the race 700*b*. The historical data 1000 also comprises the quantity of coins 1162*b* wagered on a race 700*b*. The vehicle 312*d* of the winner 1164 may be recorded along with the vehicle identifier 312*d* of the race 700*c*.

Figure 11:
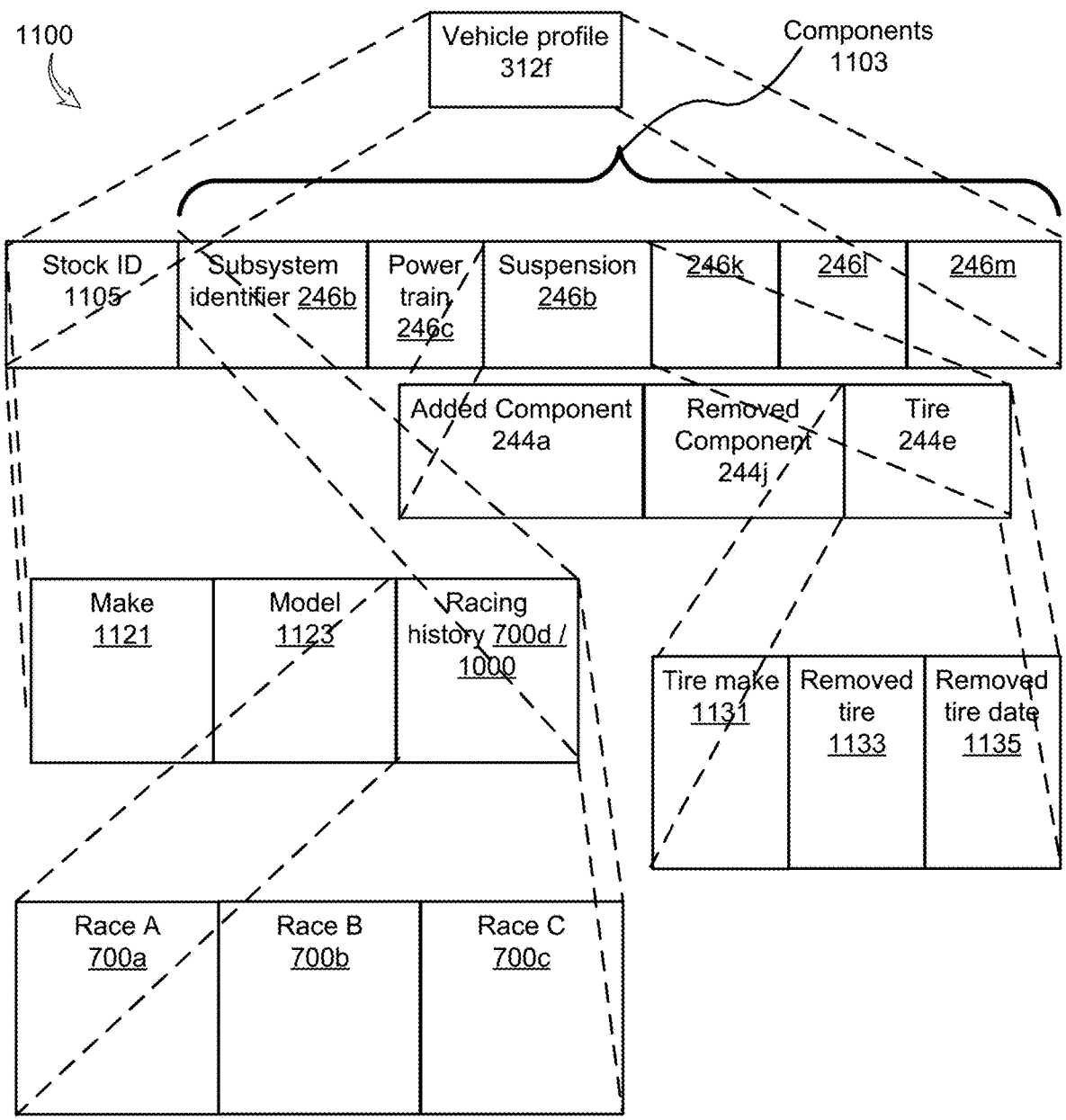
FIG. 11 is a data layout diagram illustrating automotive historical data in accordance with the present invention.

FIG. 11 is a data layout diagram illustrating automotive historical data 1100 in accordance with the present invention.

In various embodiments, the vehicle profile 312 is a computer-readable file 1100 instead of a tree data structure 230. The file 1100 may include a header 1105 identifying the stock configuration of a vehicle 332. This data 1105 may include the make 1121 of the vehicle 332, the model 1123 and the identity of races 700 within which the vehicle 332 as raced.

The file 1100 comprises a plurality of subsystem 246 packs, which packs may be exclusively associated with an identifiers 246 such as the suspension 246*b*. The suspension 246*b* pack may comprise components 1103 which have been added to, or removed from, the vehicle 312, 332, such as tires 244*e*. For each component, the make of the component 1131 is recorded along with the dates 1133, 1135 when the component or tire 244*e* was added or removed respectively.

Figure 12A:
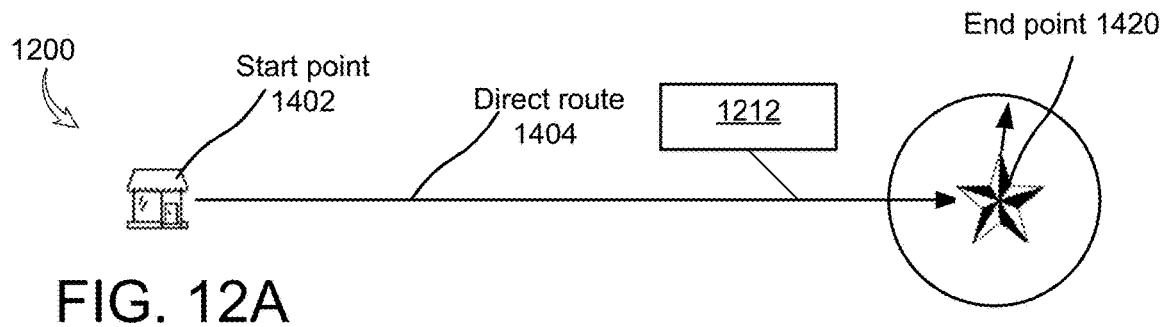
FIG. 12A is a map illustrating an automotive raceway in accordance with the present invention.

FIG. 12A is a map illustrating an automotive raceway 1200 in accordance with the present invention.

The raceway 1200, or track, is exclusively identified with an int 1212 in computer readable memory. A digital map of the raceway 1200, including a start point 1402 and an end point 1420, may stored in a race file 700.

The direct route 1200 represents the physical direct route plotted by the technology provider in accordance with the present invention. Although the direct route 1200 is shown as a straight line for illustrative purposes in FIG. 12A, in reality the direct route 1200 may meander or be plotted by the technology provider as further shown below in relation to FIGS. 12B-12D.

Figure 12B:
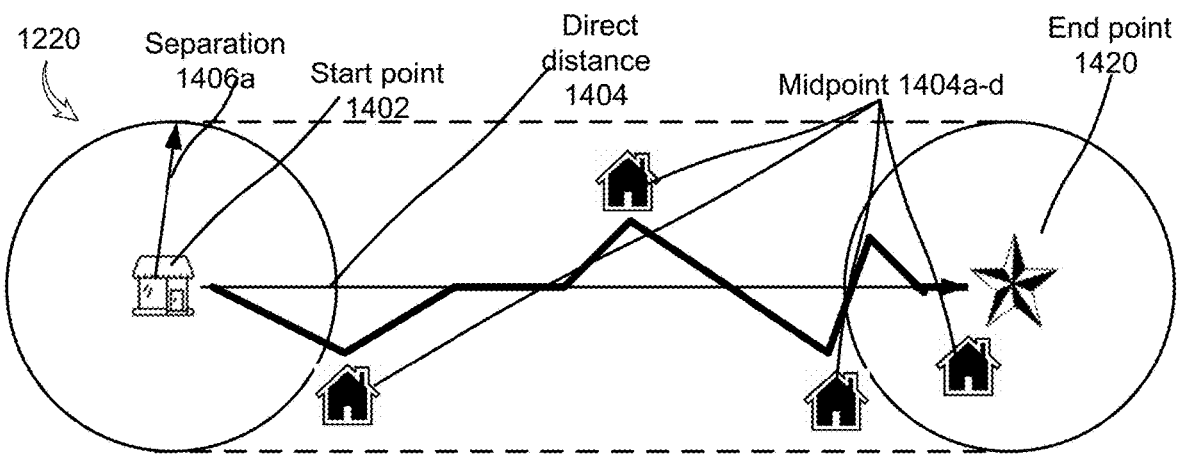
FIG. 12B is a map illustrating an automotive raceway in accordance with the present invention.

FIG. 12B is a map illustrating an automotive raceway 1220 in accordance with the present invention.

The raceway 1220 may be linear or irregularly shaped as shown. Bends, or corners, in the raceway 1220 may be recorded as midpoints 1404 in the race file 700.

Figure 12C:
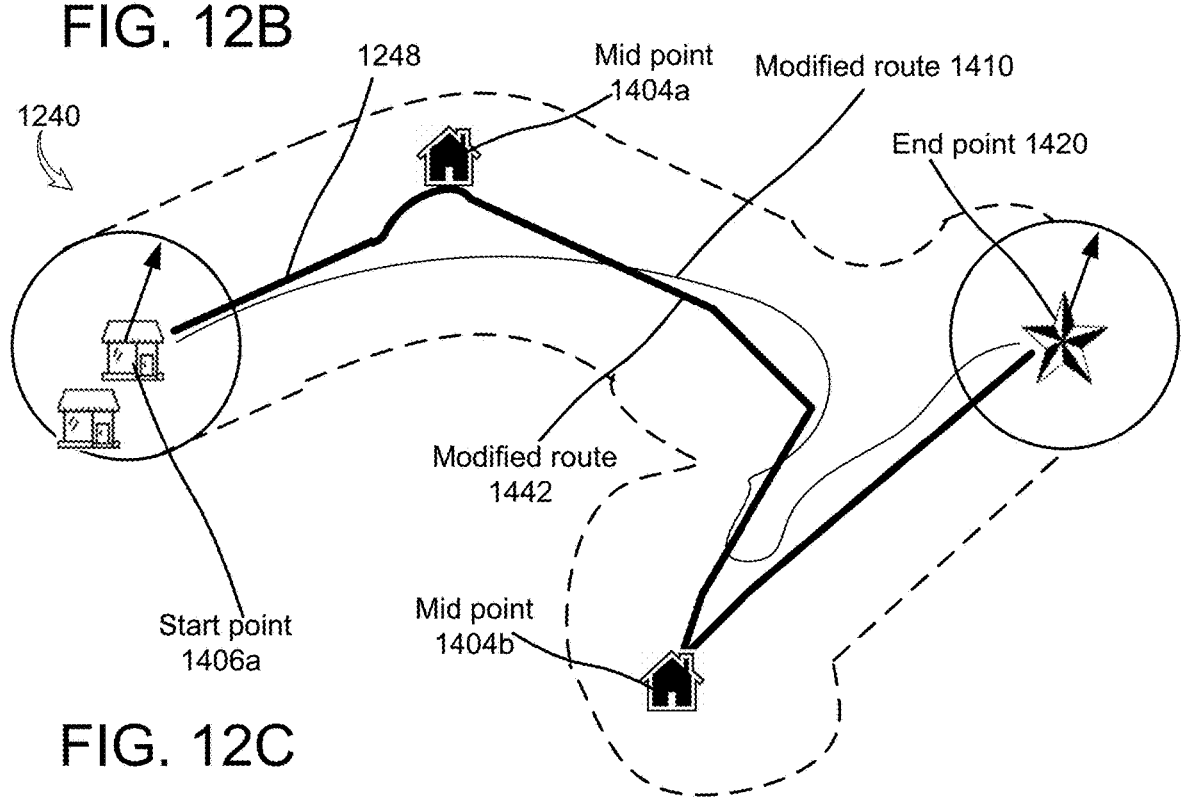
FIG. 12C is a map illustrating an automotive raceway in accordance with the present invention.

FIG. 12C is a map illustrating an automotive raceway 1240 in accordance with the present invention.

In various embodiments, the map of the raceway 1240 comprises a vector 1248 of the track and vectors 1410, 1442 of the actual routes of travel of each driver 918 to a race 700.

Figure 12D:
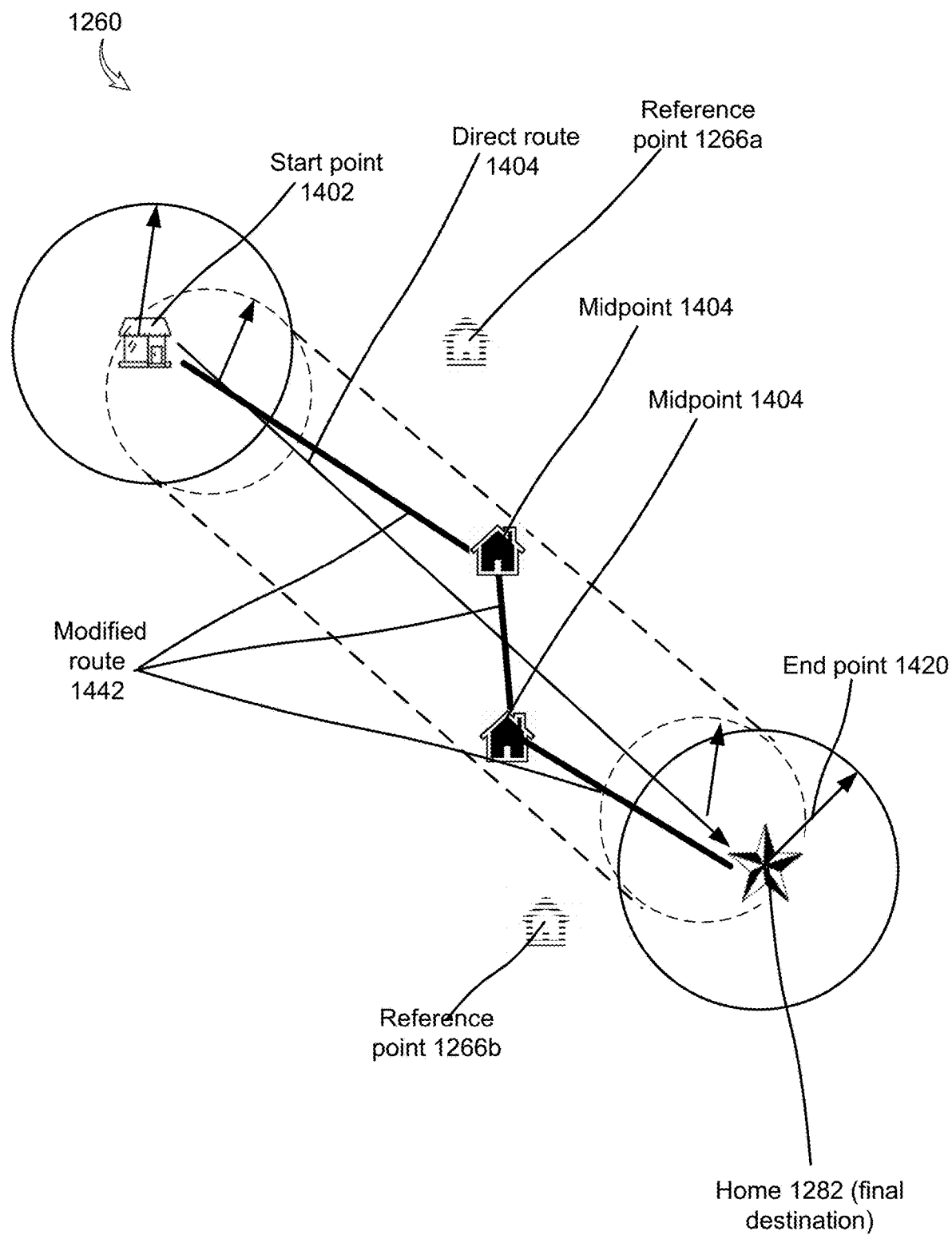
FIG. 12D is a map illustrating an automotive raceway in accordance with the present invention.

FIG. 12D is a map illustrating an automotive raceway 1260 in accordance with the present invention.

In various embodiments, the raceway 1260 comprises a plurality of raceways 1200-1240 terminating with a home point 1282. Various reference points 1266*a*-b may position near the track 1260 which act as reference points in mapping the track 1260 in computer-readable memory.

Figure 13:
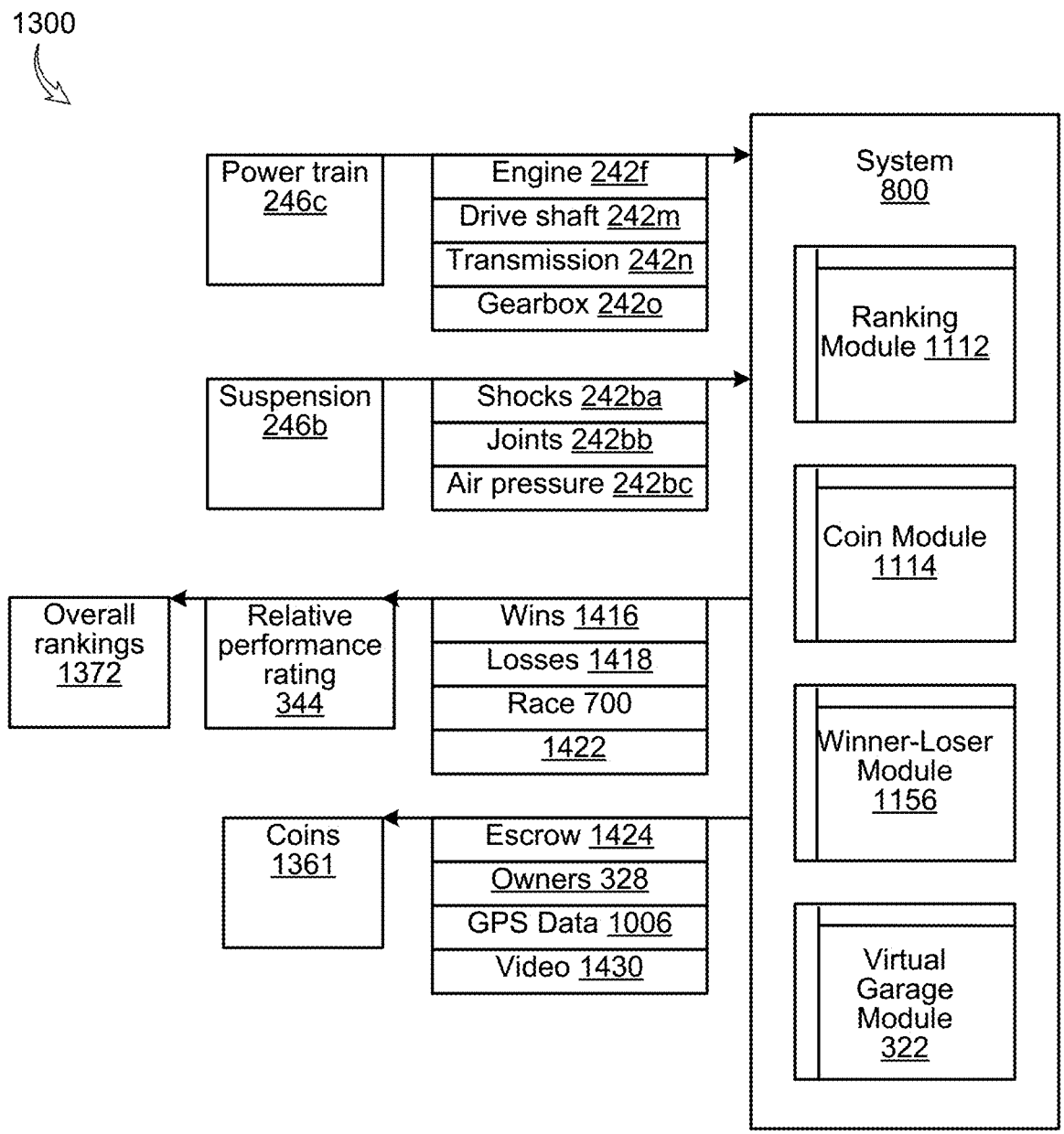
FIG. 13 is a data layout diagram illustrating a tree data structure for storing ranking data in accordance with the present invention.

FIG. 13 is a data layout diagram illustrating a data flow diagram 1300 for storing ranking data in accordance with the present invention.

Wins 1416 and losses 1418 are passed as parameters from the system 800 along with the race 700 with which each win or loss is exclusively correlated. Additional information 1422 may be passed, including time data, start time 924, and 0-60 time 922.

Additionally, the total amount of coins 1361 escrowed, or wagered, on the race 700 may pass from the system 800 as a parameter along with GPS data 1006 and digital video 1430 or media of the race 700 taken from reference points 1266 and saved in computer-readable memory in the RDBMS 904.

The modules of the system 800 and methods described herein may comprise or consist of each of the provided modules or steps. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer-implemented method for rendering a graphic representation of a vehicle within a virtual three-dimensional world, the operations of the computer program product comprising:

initiating a shared online event on a first computing device via a communication network by delivering a request to a remote server to traverse a tree data structure created in computer readable memory on the remote server using 3D files input by a second computing device in logical connectivity with the remote server, the tree data structure representative of the vehicle, wherein:

the tree data structure includes a set of leaf nodes, each leaf node pointing to one of a parent node and root node, each leaf node containing a unique part identifier and a unique vehicular subsystem identifier, the unique part identifier exclusively associated with an automotive part installed on the vehicle and the unique vehicular subsystem identifier exclusively associated with a collection of unique part identifiers forming a subsystem of the vehicle, and all of the leaf nodes containing the same unique vehicular subsystem identifier are exclusively contained within a subsystem subtree data structure within the tree data structure;

rendering a plurality of computer-readable 3D shapes in the virtual world identified within leaf nodes of the subsystem subtree data structure to create a drawn vehicular subsystem, each 3D shape contained in a separate computer-readable 3D file on the remote server;

rendering a plurality of drawn vehicular subsystems to form the graphic representation of the vehicle in the virtual world by displaying, on the first computing device, via a display tool, the graphic representation of the vehicle, wherein each 3D shape is displayed separately in sequence as the tree data structure is traversed; and updating the tree data structure in computer readable memory to include an additional leaf node that corresponds to a new part for the vehicle, thereby indicating the vehicle the further comprises the new part.

2. The computer-implemented method of claim 1, wherein the 3D files are saved using Virtual Reality Markup Language (VRML).

3. The computer-implemented method of claim 1, further comprising sharing account resources of a second computing device with the first computing device via the communication network, including the tree data structure.

4. The computer-implemented method of claim 1, wherein each 3D file is uploaded to the remote server by a third computing device on the communication network.

5. The computer-implemented method of claim 1, further comprising:

determining a winner and loser of the shared online event by referencing a first performance metric exclusively associated with a competitor and a second performance metric exclusively associated with the competitor, wherein the winner and the loser, for each competitor, is determined by:

multiplying the first performance metric by a first unique predetermined value to create a first performance value;

multiplying the second performance metric by a second unique predetermined value to create a second performance value;

adding said first performance value and said second performance value to create a performance total for each competitor;

wherein the winner is the competitor with the highest performance total and the loser is the competitor with the lowest performance subtotal;

calculating a relative performance rating of each competitor after completion of a shared online event by:

adding total performance subtotals of each competitor to a multiplier of standard deviation to produce a performance total, multiplying the performance total by a remainder of total wins minus total losses to produce an adjusted performance total; and dividing the adjusted performance total by the total events of the competitor to produce the relative performance rating.

6. The computer-implemented method of claim 5, wherein each performance metric is one of: 0-60 speed, a duration of time to complete the event, and GPS data indicated a distance traveled during said event.

7. The computer-implemented method of claim 5, wherein, for a shared online event in which three or more competitors participate, calculating the performance rating of each competitor twice, the first as a winner of an event with another competitor immediately following said competitor in the rankings, if any; and second as the loser to another competitor preceding said competitor in the rankings.

8. The computer-implemented method of claim 5, wherein the multiplier is 2.

9. A computer-implemented method, comprising:

receiving, from a remote computing device, a request to traverse a tree data structure in computer readable memory, the tree data structure representative of a vehicle, wherein the tree data structure includes a set of leaf nodes that each point to a parent node and contain a unique part identifier and a unique vehicular subsystem identifier, wherein:

the unique part identifier indicates an automotive part installed on the vehicle, the unique vehicular subsystem identifier indicates a collection of unique part identifiers forming a subsystem of the vehicle, and all leaf nodes containing the same unique vehicular subsystem identifier are within a subsystem subtree data structure of the tree data structure;

generating a graphical representation corresponding to the vehicle based on leaf nodes of the subsystem subtree data structure;

causing display, via the remote computing device, of the graphical representation of the vehicle according to the tree data structure;

receiving, from the remote computing device, an indication of an additional part associated with the vehicle; and in response to the indication of the additional part, generating an updated tree data structure for the vehicle in computer readable memory, the updated tree data structure comprising a new leaf node that corresponds to a subsystem subtree data structure for the additional part.

* * * * *